Figure 1:
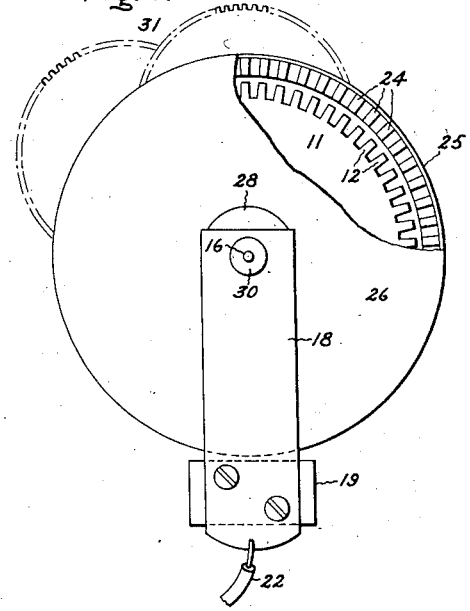

March 26, 1935.  H. E. WARREN  1,995,726

CLOCK SETTING DEVICE

Original Filed Dec. 14, 1933

Inventor:
Henry E. Warren,
by Harry E. Dunham
His Attorney.

Patented Mar. 26, 1935

1,995,726

UNITED STATES PATENT OFFICE 1,995,726

CLOCK SETTING DEVICE

Henry E. Warren, Ashland, Mass., assignor to Warren Telechron Company, Ashland, Mass., a corporation of Maine Original application December 14, 1933, Serial No. 702,347. Divided and this application March 28, 1934, Serial No. 717,765

2 Claims. (Cl. 58—34)

This is a division of my application, Serial No. 702,347, filed December 14, 1933, relating to nonself-starting synchronous motors.

In said parent application, I have described different forms of nonself-starting synchronous motors in which the stator element of the motor is rotatively mounted primarily to facilitate ease in establishing synchronous operation when the the motor is started by hand. In one form of the invention disclosed in said parent application, the motor is employed to drive a clock and the rotatable stator element is then used for the additional purpose of accurately setting the second hand of the clock when the motor is in synchronous operation. The claims in said parent application are directed to the novel features of the motor while the claims in this application are directed to the clock-setting features thereof.

A motor of the type for which the invention is primarily intended is usually started by giving the rotor thereof a spin to bring it up to a speed slightly above the synchronous speed and then allowing the rotor to decelerate to the synchronous speed where, if conditions are favorable, the rotor will fall into synchronism. In the present invention, the conditions favorable to the establishment of synchronism are assured by reason of the fact that the normally stationary element of the motor is so mounted that it may rotate in either direction by an amount sufficient to have its salient poles align with the poles in the rotating element coincident with one or more flux pulsations when the rotor is near synchronous speed. The normally stationary element may be rotated without limitation and synchronism may be established regardless of the actual speed of the rotor by reason of the fact that either or both of the motor elements may be rotated. This arrangement has the advantage that when used to drive a clock the stator may be rotated while the motor is in synchronous operation for the purpose of accurately setting the clock.

The features of my invention, which are believed to be novel and patentable, will be pointed out in the claims appended hereto. For a better understanding of my invention, reference is made in the following description to the accompanying drawings, Figs. 1 and 2 of which illustrate end and sectional side views of a form of my invention where the normally stationary primary element is inside the secondary rotor and may be rotated in either direction by reason of its being mounted on trunnions which serve also to convey the single phase energy to the stator winding.

Figure 2:
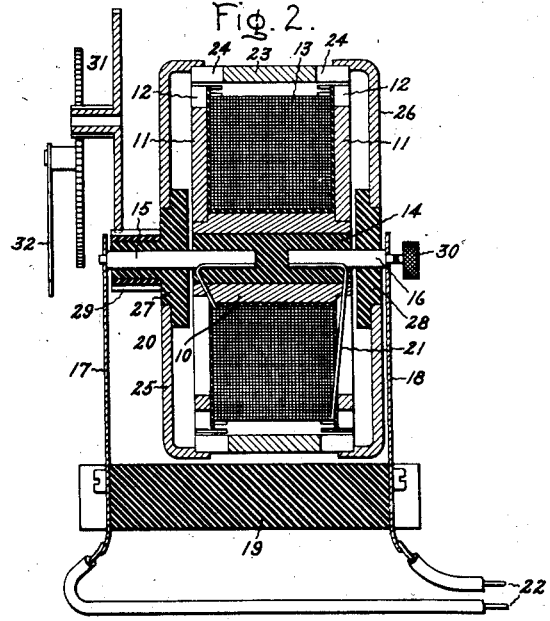

Referring now to Fig. 1, I have represented a synchronous motor of the salient pole reluctance type. The normally stationary part, which will be referred to as the stator, has a magnetic circuit which comprises a hollow steel core 10 with circular steel disc-shaped side wall pieces 11 at either end, the outer peripheries of which are notched to form salient poles 12. This magnetic circuit is energized by the coil 13 which surrounds the core 10 and occupies the space between the wall plates 11. Fitted within the core hub 10 is an insulating rod 14, and secured in the insulating rod and extending axially from either end are circular metallic shaft members 15 and 16. These shaft members have reduced sections supported in corresponding openings in metallic trunnions 17 and 18 extending from an insulated supporting block 19, and the arrangement thus serves to rotatively support the stator member at its center. Leads 20 and 21 connect the shaft members 15 and 16 to the two ends of the single phase energizing coil 13 so that the motor may be energized by connecting the source of supply 22 across the two trunnions 17 and 18 as represented. The trunnions are of resilient material and are tensioned slightly to produce an inward end pressure on the stepped portions of the shaft members 15 and 16 so that, under normal synchronous operating conditions, sufficient friction is encountered to keep the stator element from rotating.

The rotor member has an outer cylindrical steel member 23, having teeth 24 cut in its opposite ends adjacent to and spaced from the teeth 12 in the side walls of the stator. The salient pole rotor member 23 is supported on a non-magnetic spider consisting of side pieces 25 and 26 which, in turn, are supported on axial bearings 27 and 28 rotatively supported on the normally stationary shaft members 15 and 16 between the trunnions and the stator. I have found that the bearing members 27 and 28 may be made of oil impregnated wood with satisfactory results. This insulates the end shields 25 and 26 from the conductor shaft extensions 15 and 16. The bearing member 27 has an axial extension which carries a pinion 29 for conveying the rotation of the rotor to the clock or other mechanism to be driven.

When single-phase energy is supplied at 22, the current is conveyed through the trunnions 17 and 18, shaft members 15 and 16, and leads 20 and 21 to coil 13. An alternating flux is set up between the magnetic parts of stator and rotor as follows:—through core 10, side piece 11, teeth 12, across the narrow radial air gap to teeth 24 across part 23 to the teeth on the opposite end and returning to the stator through side piece 11. Such a motor is not self-starting but, if the parts have relative rotation at a speed where the teeth in stator and rotor come opposite each other in synchronism with the flux pulsations, the motor will develop a synchronous torque at such speed and may be used for driving light loads such, for example, as synchronous clocks and analogous devices.

Such a motor may be started by placing the finger on the outer shell of the part 23 and giving the rotor a spin in the direction in which rotation is desired to bring the rotor up to or slightly above synchronous speed with the field excited.

Since the stator may rotate against a slight friction, it will turn one way or the other as necessary to align its teeth with the rotor teeth coincident with a flux pulsation to easily establish synchronism, after which the stator will come to rest and the rotor will drive the load through the pinion 29. The load torque must, of course, be less than the torque necessary to rotate the stator element against the friction at the trunnions if a true synchronous operation of the load is desired but, since a clock load is very small, there is no difficulty in adjusting the stator friction between a value to prevent its rotation under normal conditions and a value which will permit it to turn slightly under the pull in torque conditions which exist at the moment of synchronism. The same arrangement prevents the motor from falling out of step easily due to variations in frequency and sudden changes in load, because the friction torque necessary to turn the stator is less than the synchronous pull out torque of the motor, and a slight rotational movement of the stator occurs under such conditions, effectively preventing the motor from falling out of synchronism. Thus the friction torque necessary to move the stator should be greater than the torque necessary to drive the connected load under normal conditions but less than the synchronizing torque of the motor.

It will be observed that the pancake-shaped coil 13 supported by the primary member is substantially incased by the primary and secondary magnetic members which have their two sets of salient pole pieces separated by narrow air gaps concentic to the axis of rotation of the motor. The coil produces an alternating flux in series relation through both of the primary and secondary magnetic members and across the air gap. The parts are supported on the same axis of rotation by electrically insulated bearing members having parts common to both stator and rotor. The arrangement provides an efficient, inexpensive, compact, reluctance motor construction that is easily synchronized.

On the extension of shaft member 16, I have shown an insulated thumb piece 30 secured thereto. Instead of spinning the rotor, I may spin the stator to establish synchronism, in which case, the stator should be spun in the direction opposite to that in which rotation is desired. After synchronism is established, the stator comes to rest as the rotor speeds up. Also, I may spin both rotor and stator in opposite directions until their relative speeds correspond to about the synchronous speed to establish synchronism. It is, however, unnecessary to spin the stator to establish synchronism and the thumb piece 30 is not essential for this purpose but may be convenient in instances where the construction of which the motor is a part makes it difficult to get at the rotor.

The rotational feature of the stator permits an additional desirable result to be accomplished in that it permits of easy and very accurate setting of the second hand of a clock driven by the motor while the same is in normal operation. To illustrate this feature, I have represented at 31 suitable reduction gearing between the rotor pinion 29 and a second hand 32 of a clock. If the motor has 60 salient poles, the speed at 60 cycles will be 120 R. P. M. and will require a 120 to 1 gear reduction between it and the second hand of the clock. In such a construction, the second hand may be advanced or retarded by manually turning the stator with the thumb piece 30 in one direction or the other. This is done while the device is in normal operation and without danger of getting the motor out of synchronism. In the arrangement described, a complete rotation of the stator corresponds to a three degree movement of the second hand or a correction of one-half second. It is thus evident that the device affords an easy and convenient way of very accurately adjusting the second hand while the motor is in normal operation driving the clock.

Having described the principle of operation of my invention and various ways of carrying it into effect, I seek claims commensurate with the true spirit and scope thereof without limitation as to specific details of construction.

What I claim as new and desire to secure by Letters Patent of the United States is:

1. A synchronous clock motor having a rotor and a stator, the latter being normally stationary but rotatively mounted on the axis of rotation of the motor rotor, a clock second hand synchronously driven by said motor through reduction gearing, and means for turning the stator of said motor while the motor is in synchronous operation for setting said second hand.

2. A synchronous clock motor of the nonself-starting reluctance type having a rotor and a stator, the latter being normally stationary but mounted to yieldingly rotate on the axis of rotation of the rotor in response to the pull in torque of said motor to assist in synchronizing the motor when it is started, a second hand, speed-reducing means through which said hand is driven by said motor, and manual means for turning the stator of said motor while in normal synchronous operation for setting said second hand.

HENRY E. WARREN.